US012577090B2

(12) United States Patent
Kaul

(10) Patent No.: US 12,577,090 B2
(45) Date of Patent: Mar. 17, 2026

(54) CONTAINER LIFTING DEVICES AND METHODS FOR LIFTING CONTAINERS

(71) Applicant: Toyota Research Institute, Inc., Los Altos, CA (US)

(72) Inventor: Lukas Sebastian Kaul, Mountain View, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 480 days.

(21) Appl. No.: 18/130,546

(22) Filed: Apr. 4, 2023

(65) Prior Publication Data

US 2024/0336464 A1 Oct. 10, 2024

(51) Int. Cl.
*B66F 9/18* (2006.01)

(52) U.S. Cl.
CPC .............. *B66F 9/186* (2013.01); *B66F 9/184* (2013.01)

(58) Field of Classification Search
CPC .......... B66F 9/186; B66F 9/184; B66F 9/187; B66F 9/188
USPC .......... 414/338
See application file for complete search history.

(56) References Cited

U.S. PATENT DOCUMENTS 2,869,742 A * 1/1959 Hileman ................ B66F 9/188 414/622
3,002,639 A * 10/1961 Cavanagh ............... B66F 9/188 414/640
3,845,868 A * 11/1974 Myers ..................... B65F 1/141 414/338
4,508,484 A * 4/1985 Heiz ...................... B65G 47/61 414/337
4,708,583 A * 11/1987 Moen ...................... B65G 1/00 414/373
4,921,305 A * 5/1990 Steer ......................... B62B 1/22 298/3
5,735,663 A * 4/1998 Zachhuber ............. B65F 1/141 414/419
6,394,739 B1 * 5/2002 Hutchinson ............. B66F 9/188 414/623

FOREIGN PATENT DOCUMENTS

| | | | |
|---|---|---|---|
| CN | 105016250 | B | 8/2017 |
| CN | 209796943 | U | 12/2019 |
| CN | 214091230 | U | 8/2021 |
| CN | 115448223 | A | 12/2022 |
| DE | 19634709 | A1 | 3/1998 |

* cited by examiner

*Primary Examiner* — Jonathan Snelting
(74) *Attorney, Agent, or Firm* — Dinsmore & Shohl LLP

(57) ABSTRACT

Methods and devices for picking up containers using a lifting-container device are disclosed. The container-lifting device may include a lifting fork, a friction contact surface, and a passive lifting mechanism. The passive lifting mechanism is coupled to the lifting fork and the friction contact surface on the two ends. The friction contact surface is configured to lift a target container. The lifting fork is configured to slide underneath the target container when the container is lifted. The passive lifting mechanism may transfer a fraction of a forward momentum of the container-lifting device into an upward momentum, and the friction contact surface may lift the target container by applying an upward friction force to one or more sides of the target container as a result of the upward momentum.

20 Claims, 6 Drawing Sheets

CONTAINER LIFTING DEVICES AND METHODS FOR LIFTING CONTAINERS

TECHNICAL FIELD

The present disclosure relates to automated object handling technology, and more particularly, to container lifting devices and methods for lifting containers.

BACKGROUND

Cardboard boxes and other containers are extensively employed for transporting various types of goods. These boxes are tightly packed and stacked in the back of trucks or box holders. Unloading such stacked boxes is a labor-intensive process that is common in many supply chains. This involves workers climbing into the trucks or the box holders in a warehouse and manually picking up each box and placing them on a conveyance mechanism. Therefore, there is a need for a container-lifting device that can rapidly, accurately, and efficiently unload high-stacking boxes.

SUMMARY

Embodiments disclosed herein are directed to methods and devices for picking up containers, such as boxes. In accordance with one embodiment of the present disclosure, a container-lifting device may include a lifting fork having a front end and a back end, a friction contact surface, and a passive lifting mechanism having a first end and a second end. The first end of the passive lifting mechanism may engage the lifting fork between the front end and the back end, and the second end of the passive lifting mechanism may be coupled to the friction contact surface. The friction contact surface may be configured to lift a target container. The lifting fork may be configured to slide underneath the target container when the container is lifted. The passive lifting mechanism may transfer a fraction of a forward momentum of the container-lifting device into an upward momentum at the second end, and the friction contact surface lifts the target container by applying an upward friction force to one or more sides of the target container as a result of the upward momentum.

In accordance with another embodiment of the present disclosure, a method may include approaching a target container at a forward momentum of the container-lifting device including a lifting fork having a front end and a back end, a friction contact surface, and a passive lifting mechanism having a first end and a second end, wherein the first end of the passive lifting mechanism engages the lifting fork between the front end and the back end, and the second end of the passive lifting mechanism is coupled to the friction contact surface; contacting, using the friction contact surface, a front side of the target container; transferring, using the passive lifting mechanism, a fraction of the forward momentum into an upward momentum at the second end such that the friction contact surface applies an upward friction force to the front side of the target container and lifts the front side of the target container; sliding the lifting fork underneath the front side of the target container; and extracting the target container on the lifting fork.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein include devices and methods for unloading stacked containers using a mechanical container-lifting device. A container-lifting device is a device that is used to extract containers or other objects from a storage area. The specific type of container-lifting device used will depend on the size and weight of the containers being lifted, as well as the location and layout of the storage area. In an environment of a warehouse or on the back of trucks, containers are tightly packed, therefore presenting challenges such as being hard to reach, limited space to move around, being time-consuming, and having difficulty in grasping a wide variety of containers. A common approach to dealing with these challenges is to use an array of suction cups, paired with one or more strong vacuum pumps to pick up the containers and move them around. However, a container-lifting system using suction technologies is limited by several drawbacks. For example, the vacuum pumps and the required hoses add complexity and cost to the system. In order to keep the system operating smoothly, it is recommended to regularly maintain and replace vacuum pumps. Battery life becomes an issue considering the high demands of sucking power such as in a forklift.

The embodiments described herein are directed to container-lifting devices that are passive, driven only by their relative motion with respect to the container it is lifting. The container-lifting devices described herein do not require a vacuum pump or any other additional power source. Further, the container-lifting device is compatible with different systems and may be mounted to a robot arm as a mechanical end-effector, a human-operated push-cart, a forklift, or a palletizer.

When the container-lifting device is used in a robot arm system, it can be used in a depalletization process. Depalletization involves unloading containers from container holders or pallets one by one, using artificial intelligence to recognize and handle individual containers. This differs from classic delayerization, in which a robot gripper lifts the entire pallet, risking missing some containers. Robotic depalletization offers several advantages over delayerization, including the need for a smaller placement area and a lighter payload, which allows for the use of a smaller robot arm and gripper. These factors can result in significant cost savings. A robot system equipped with the mechanical container-lifting device may place each container individually onto a conveyor belt or other predetermined location, providing a higher level of precision in the unloading process.

Figure 1:
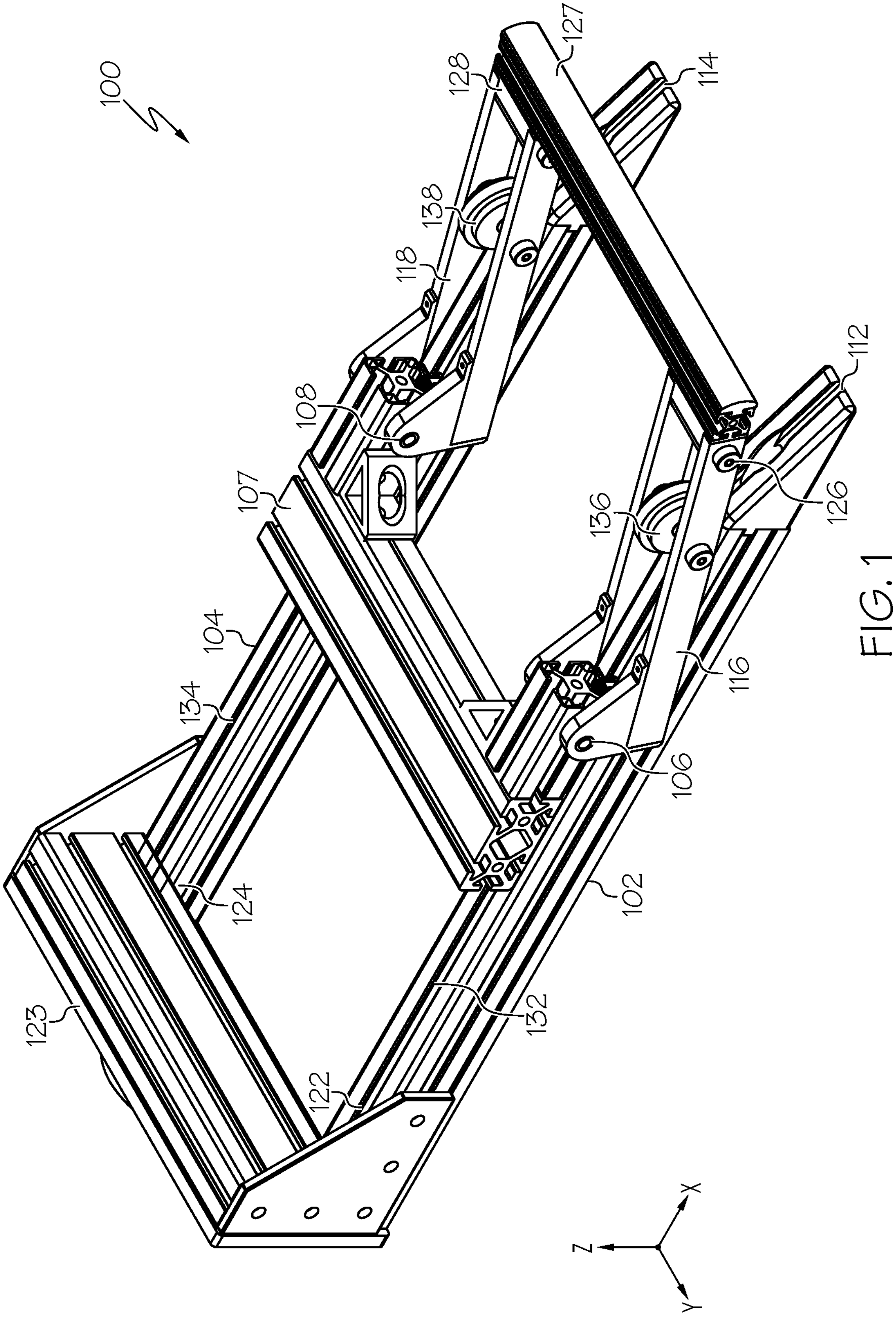
FIG. 1 schematically depicts an example container-lifting device of the present disclosure, according to one or more embodiments described and illustrated herein.

Referring initially to FIG. 1, an example container-lifting device 100 for lifting containers, such as boxes, is illustrated. A container-lifting device 100 comprises a lifting fork 102 having a front end 112 and a back end 122, a friction contact surface 127, and a passive lifting mechanism 116 having a first end 106 and a second end 126. As shown in FIG. 1, the container-lifting device 100 may comprise a first lifting fork 102 and a second lifting fork 104. Each lifting fork has a front end (112 and 114 for the first lifting fork 102 and the second lifting fork 104, respectively) and a back end (122 and 124 for the first lifting fork 102 and the second lifting fork 104, respectively). The container-lifting device 100 may comprise a first passive lifting mechanism 116 and a second passive lifting mechanism 118. The first passive lifting mechanism 116 and the second passive lifting mechanism 118 each have a first end 106, 108, respectively, and a second end 126 and 128, respectively. The first ends 106, 108 of the first and second passive lifting mechanisms 116, 118 may engage with the first and second lifting forks 102, 104 between the front ends 112, 114 and the back ends 122, 124. The second ends 126, 128 of the first and second passive lifting mechanisms 116, 118 may engage with the friction contact surface 127.

The first ends 106, 108 of the first and second passive lifting mechanisms 116, 118 are configured to move along the first and second lifting fork 102, 104 toward the front ends 112, 114 or the back ends 122, 124 on tracks 132, 134. The first end 106 of the first passive lifting mechanism 116 may be pivotally coupled to the first lifting fork 102 between the front end 112 and the back end 122 of the first lifting fork 102. Similarly, the first end 108 of the second passive lifting mechanism 118 may be pivotally coupled to the second lifting fork 104 between the front end 114 and the back end 124 of the second lifting fork 104. Particularly, the first and second passive lifting mechanisms 116, 118 may transfer a fraction of a forward momentum of the container-lifting device 100, when the container-lifting device 100 moves toward a target container 202, into an upward momentum at the second ends 126, 128. The friction contact surface 127 may lift the target container 202 by applying an upward friction force on the front side of the target container 202 as a result of the upward momentum.

A forward momentum presents a forward velocity indicating the container-lifting device 100 is moving toward a target container 202 as in FIGS. 2A-2D. An upward momentum presents an upward velocity that the friction contact surface 127 is moving upward. Particularly, as shown in FIGS. 1 and 2A-2D, a forward momentum is in the positive direction of X-axis, and an upward momentum is in the positive direction of Y-axis.

Figure 2A:
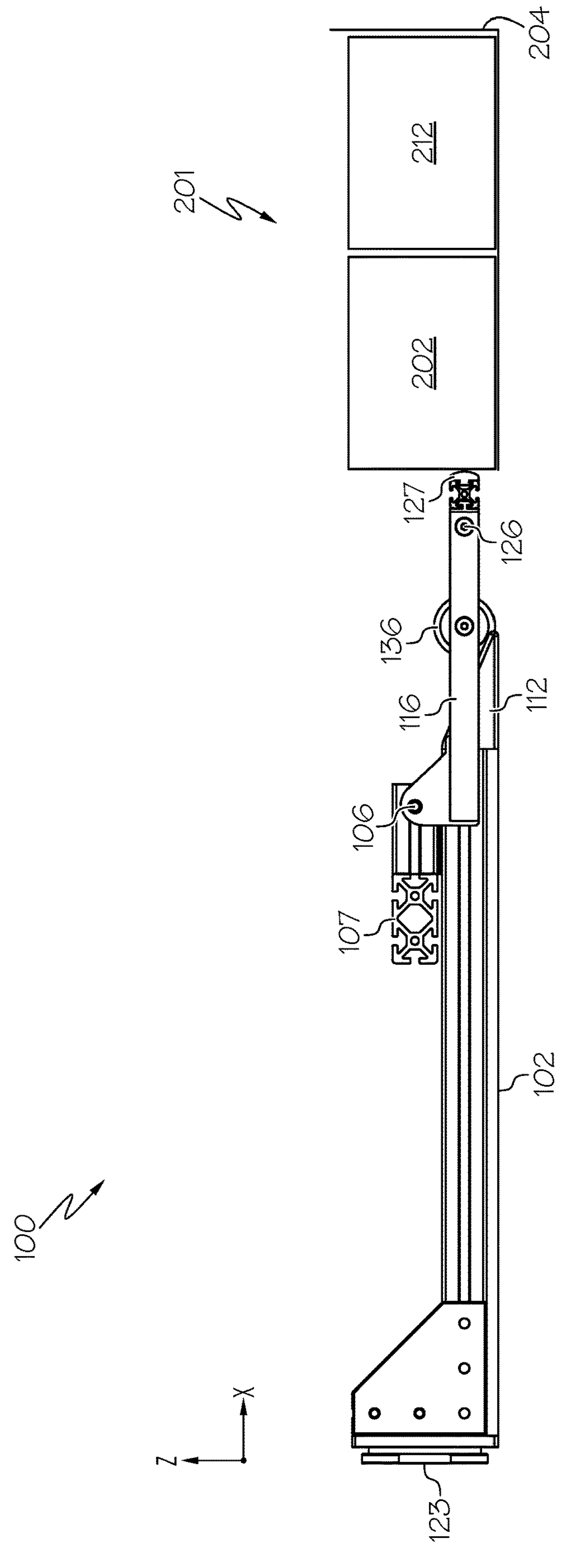
FIG. 2A schematically depicts an example container-lifting device approaching the target container in the process of extracting a target container, according to one or more embodiments described and illustrated herein.

The first end, such as the first end 106 of the first passive lifting mechanism 116 and the first end 108 of the second passive lifting mechanism 118 are coupled to the first and second lifting forks 102, 104. In embodiments, the first lifting fork 102 and the second lifting fork 104 may be coupled to a sliding bar 107, which is configured to slide back and forth along the length of the first and second lifting forks 102, 104. As shown in FIG. 1, the first ends 106, 108 are coupled to the sliding bar 107, via rivets or other mounting structures. For example, the first ends 106, 108 may have a pin structure inserted through the holes at the end of the sliding bar 107. The sliding bar 107 is configured to engage with the first and second lifting forks 102, 104. The sliding bar 107 may hold the first and second passive lifting mechanisms 116, 118 securely in place within the container-lifting device 100 and prevent them from sliding around during transport or movement. The sliding bar 107 may be attached to the top of the first and second lifting forks 102, 104 using brackets or other mounting hardware and be arranged to form a bridge between them. The sliding bar 107 may be slid back and forth along the length of the first and second lifting forks 102, 104, with a locking mechanism to hold it in place once the sliding bar 107 is positioned. When the sliding bar 107 moves toward the front ends 112, 114, the first and second passive lifting mechanisms 116, 118 are pushed forward with the friction contact surface 127 to the front of the container-lifting device 100. It allows the container-lifting device 100 in a position to approach and contact a target container (e.g., a target container 202 in FIGS. 2A-2D) with the friction contact surface 127 to the most forward position as illustrated in FIG. 2A.

In embodiments, the second ends 126, 128 of the first and second passive lifting mechanisms 116, 118 engage with the friction contact surface 127. The friction contact surface 127 may be in the shape of a bar or clamp that may contract one or more sides of the target container 202 (or other containers). A selected shape of the friction contact surface 127 may achieve a high contact area between the friction contact surface 127 and the target container 202. The friction contact surface 127 may be configured to lift a front side of a target container during the process of lifting and extracting the target container 202. When the friction contact surface 127 lifts the target container 202, the first and second lifting forks 102, 104 are operable to slide underneath the target container 202.

The friction contact surface 127 may have a friction coefficient factor of at least 0.1. In some embodiments, the friction coefficient factor of the friction contact surface 127 may be at least 0.2, or at least 0.3, or at least 0.4, or at least 0.5, or at least 0.6, or at least 0.7, or at least 0.8, or at least 0.9, or at least 1.0, or at least 1.1, or at least 1.2, or at least 1.3. The friction coefficient factor may be a static friction coefficient factor or a kinetic friction coefficient factor. A static friction coefficient factor depicts static friction that keeps an object up to the point that the object just starts moving. A kinetic friction coefficient factor is the ratio of the friction force to the normal force, depicting the friction force that resists the motion of an object.

The friction contact surface 127 may include, without limitation, rubber, thermoplastic elastomer (TPE), and/or neoprene fabric. In some embodiments, the friction contact surface 127 may have a friction coating. The friction coating may comprise two-dimensional materials, such as, without limitation, $MoS_2$, graphite, and boron nitride.

In embodiments, as illustrated in FIG. 1, the first and second passive lifting mechanisms 116, 118 may comprise a first roller 136 and a second roller 138, respectively. The first roller 136 may be located between the first end 106 and the second end 126 of the first passive lifting mechanism 116. Similarly, the second roller 138 may be located between the first end 108 and the second end 128 of the second passive lifting mechanism 118. The first and second rollers 136, 138 may include a wheel, and a shaft coupled to the passive lift mechanism. The wheel may come into contact with the surface it is rolling on, namely the ground and the first and second lifting forks 102, 104. The wheel may be made of a durable material such as rubber, plastic, or metal. The shape of the wheel may be cylindrical, spherical, tapered, flanged, or V-shaped. The diameter of the wheel may be greater than the vertical height of the first and second passive lifting mechanisms 116, 118 such that at least a portion of the wheel may contact the surface of the ground when the first and second rollers 136, 138 are more forward than the front end 112, 114, or contact the first and second lifting forks 102, 104 when the first and second rollers 136, 138 are less forward than the front end 112, 114.

In embodiments, the first and second rollers 136, 138 may further comprise a bearing that allows the wheel to rotate smoothly and efficiently by reducing friction and wear between the moving parts of the first and second rollers 136, 138. The bearing may consist of two rings with small metal balls or rollers between them. The first and second rollers 136, 138 may also comprise a shaft, which may be a long, cylindrical component that connects the wheel and bearing to the first and second passive lifting mechanisms 116, 118. The shaft may be, without limits, made of metal. The shaft may be designed to transmit torque from the first and second passive lifting mechanisms 116, 118 to the wheel, causing it to rotate.

The first and second rollers 136, 138 may transfer the forward momentum in X direction into the upward movement by moving onto the first and second lifting forks 102, 104. The first and second rollers 136, 138 may provide an efficient means of transferring the motion of the first and second rollers 136, 138 to the first and second passive lifting mechanisms 116, 118 in accordance with the surface being rolled on. By coupling the shaft to the first and second passive lifting mechanisms 116, 118, the first and second rollers 136, 138 may be lifted when the first and second rollers 136, 138 moves onto the first and second lifting forks 102, 104, causing the momentum transition from forward momentum to upward momentum. In embodiments, the forward momentum may be transferred into the upward movement using a lever mechanism. As illustrated in FIG. 1, the first ends 106, 108 may not freely move in the vertical direction and function as a fulcrum when the first ends 106, 108 are pinned to the sliding bar 107. When the first and second rollers 136, 138 move onto the first and second lifting forks 102, 104, an effort is provided on the first and second passive lifting mechanisms 116, 118, causing an upward motion such that the friction contact surface 127, which is attached to the second ends 126, 128, moves upward. In some embodiments, when the first and second rollers 136, 138 moves onto the first and second lifting forks 102, 104, the first and second rollers 136, 138 may move along a track of the first and second lifting forks 102, 104, such as tracks 132, 134.

The container-lifting device 100 may employ different types of passive lifting mechanism to transfer the forward momentum into the upward movement. For example, the container-lifting device 100 may comprise a passive lifting mechanism using a rubber drum system or a hydraulic system.

Referring to FIG. 1, the front ends 112, 114 of the first and second lifting forks 102, 104 may have one or more inclined planes. The first and second lifting forks 102, 104 may further comprise one or more tracks that the passive lifting mechanism moves along, such as a track 132 of the first lifting fork 102 and a track 134 of the second lifting fork 104. The tracks 132, 134 may extend through the upper surface of the first and second lifting forks 102, 104, including the upper surface of the incline planes. The first and second rollers 136, 138 may move along the inclined planes from the ground surface onto the first and second lifting forks 102, 104. The tracks 132, 134 on the upper surface of the inclined planes may help the first and second rollers 136, 138 move along the length of the first and second lifting forks 102, 104 without side motions.

In embodiments, the lifting fork 102 or 104 may be, without limitation, a standard fork, a block fork, a telescopic fork, a scale fork, a bolt-on fork, a tire fork, a corrugated fork, a peek-a-boo (PAB) fork, or a pallet fork. The container-lifting device 100 may include a tray in replace of the first and second lifting forks 102, 104. The tray may include a left plane, right plane and a bottom plane. The left plane and the right plane may have comparable structures as the first and second lifting forks 102, 104 as described herein.

The container-lifting device 100 may further include a mount flange 123 coupled to the back ends 122, 124 of the first and second lifting forks 102, 104. The mount flange 123 may be configured to be coupled to a robot arm, a forklift, or a palletizer.

FIG. 2A-2D schematically depicts a process of picking up a target container using an example container-lifting device. The process may include an approaching step, a lifting step, a sliding underneath step, and an extracting step. The lifting-container device may be a mechanical end-effector that is mounted on a robot arm. The energy required to pick up the container may be derived from the motion of the mechanical end-effector as moved by the robot arm while no external device or energy is required to pick up the container.

It is noted that it is in no way intended that any method set forth herein be construed as requiring that its steps be performed in a specific order, nor that with any apparatus specific orientations be required. It is also noted that it will be apparent to those skilled in the art that various modifications and variations can be made to the embodiments described herein without departing from the scope of the claimed subject matter.

In embodiments, a stack of containers 201 (or other containers), including a target container 202 and one or more additional containers 212, may be closely packed and stored on a container stack holder 204. The container stack holder 204 may be located in a warehouse or on the back of a truck. During the process, the lifting fork 102 may be adjusted to match the width of the target container 202.

Referring to FIG. 2A, in the approach step, the container-lifting device 100 may approach a target container 202 at a forward momentum of the container-lifting device 100 and contact the front side of the target container 202 with the friction contact surface 127. The lifting fork 102 may be lowered to ground level with the friction contact surface 127 to the most forward position. The lifting fork 102 may be at its lowest position, which is close to the ground. The passive lifting mechanism 116 may be at a position close to the front end 112 of the lifting fork 102. The roller 136 may come into contact with the ground surface and may roll on the ground surface. During the process of approaching the target container 202, the friction contact surface 127 may be closer to the target container 202 than the passive lifting mechanism 116 and the lifting fork 102. For example, the friction contact surface 127 may be more forward than the front end 112 of the lifting fork 102.

Figure 2B:
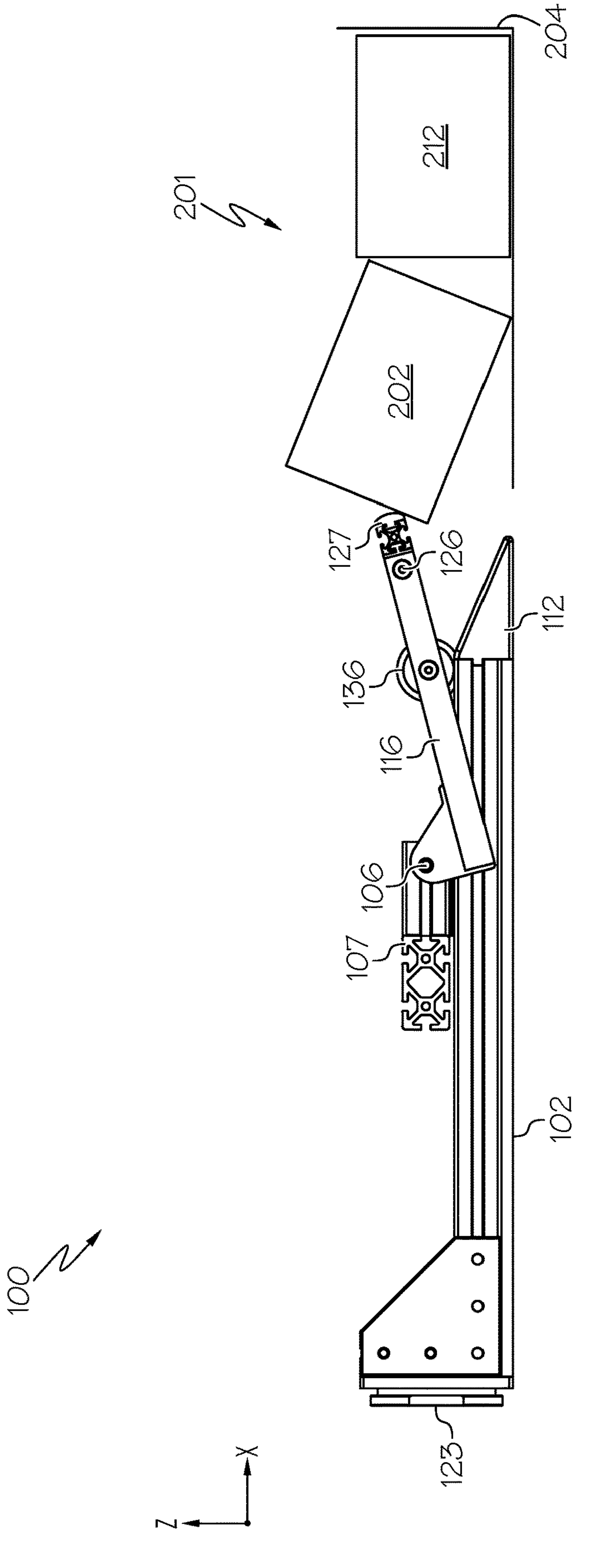
FIG. 2B schematically depicts an example container-lifting device lifting the target container in the process of extracting a target container, according to one or more embodiments described and illustrated herein.

Referring to FIG. 2B, in the lifting step, the container-lifting device 100 may be pushed forward and kept moving toward the target container 202, and use the passive lifting mechanism 116 to transfer a fraction of the forward momentum of the container-lifting device 100 into an upward momentum at the second end 126 such that the friction contact surface 127 applies an upward friction force to the front side of the target container 202 and lifts the front side of the target container 202. During the process, a lever mechanism may be used to cause the second end 126 of the passive lifting mechanism 116 and the friction contact surface 127 to move upward. The first end 106 may not freely move in the vertical direction and function as a fulcrum when the first end 106 is pinned to the sliding bar 107. When the roller 136 moves onto the lifting fork 102, an effort is provided on the passive lifting mechanism 116, causing an upward motion such that the friction contact surface 127, which is attached to the second end 126, moves upward. In some embodiments, when the roller 136 moves onto the lifting fork 102, the roller 136 may move along a track of the lifting fork 102, such as track 132 in FIG. 1. At the same time, the passive lifting mechanism 116 may move toward the back end 122 of the lifting fork 102.

In embodiments, the roller 136 may provide an efficient means of transferring the motion of the roller 136 to the passive lifting mechanism 116 in accordance with the surface being rolled on. The roller 136 may be lifted when the roller 136 moves from the ground surface onto the inclined plane at the front end 112 of the lifting fork 102, causing the momentum transition from forward momentum to upward momentum. The passive lifting mechanism 116 may function as a lever with the first end 106 as a fulcrum, which cannot freely move in the vertical direction. When the roller 136 moves onto the lifting fork 102, an effort is provided on the passive lifting mechanism 116, causing an upward motion such that the friction contact surface 127, which is attached to the second end 126, moves upward.

Figure 2C:
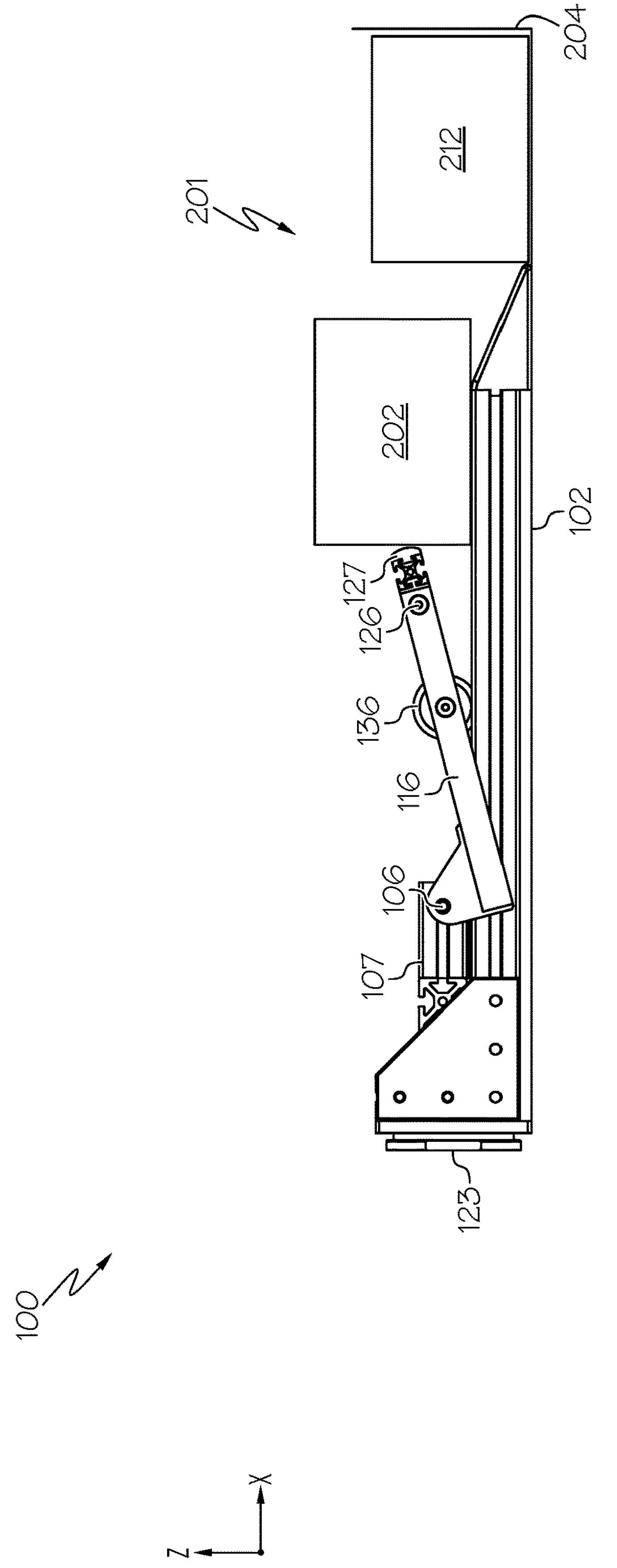
FIG. 2C schematically depicts an example container-lifting device sliding under the target container in the process of extracting a target container, according to one or more embodiments described and illustrated herein.

Referring to FIG. 2C, in the sliding underneath step, the container-lifting device 100 may be pushed forward and kept moving toward the target container 202 and may slide the lifting fork 102 underneath the front side of the target container 202. During the process, the friction contact surface 127 and the passive lifting mechanism 116 may move backward. The friction contact surface 127 may keep contacting with the target container 202, and the passive lifting mechanism 116 moves toward the back end 122 of the lifting fork 102. The container-lifting device 100 may be continuously pushed toward the target container 202 until the target container 202 fully slides onto the lifting fork 102. After the target container 202 fully slides onto the lifting fork 102, the lifting fork 102 may tilt backward to stabilize the load and prevent the target container 202 from sliding off the lifting fork 102 during transport. For example, a force may be applied on the container-lifting device 100 passing through the mount flange 123 to create torque and lift the front end 112 of the lifting fork 102 higher than the back end 124 until a desirable tile angle is achieved between the horizontal plane and the lifting fork 102. The title angle may be further adjusted during the sliding underneath step and the extracting step.

Figure 2D:
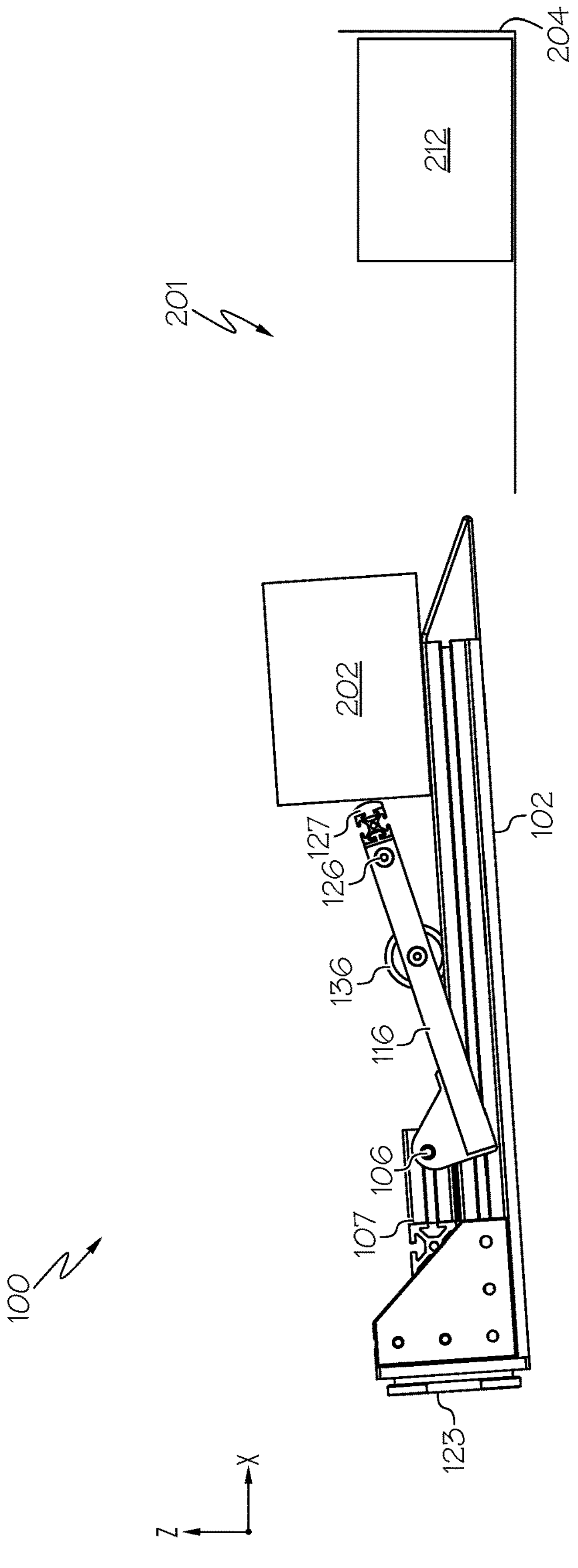
FIG. 2D schematically depicts an example container-lifting device extracting with the target container on top in the process of extracting a target container, according to one or more embodiments described and illustrated herein.

Referring to FIG. 2D, in the extracting step, the container-lifting device 100 may be extracted with the target container 202 on the lifting fork 102. Following the extracting step, the container-lifting device 100 may be transported to a desired location to unload the target container 202.

Figure 3:
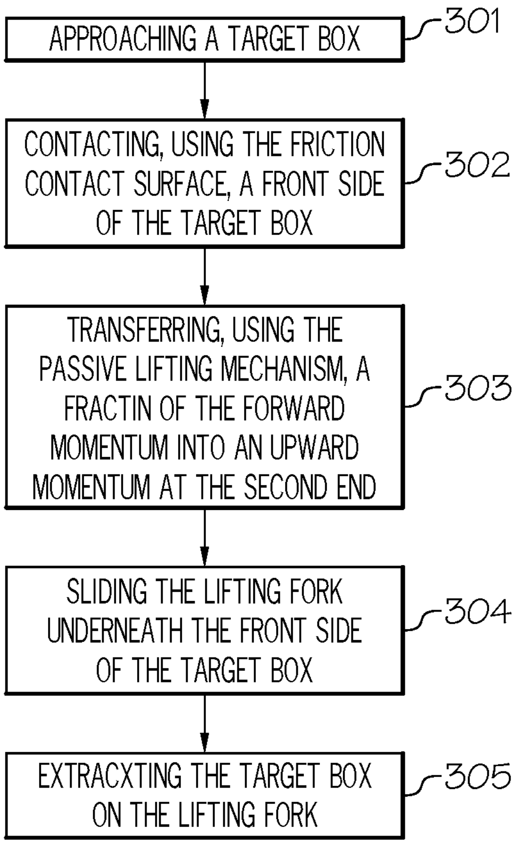
FIG. 3 illustrates a flow diagram of an illustrative method of lifting a target container using a container-lifting device, according to one or more embodiments described and illustrated herein.

FIG. 3 illustrates a flow diagram of an illustrative method of lifting a target container using the container-lifting device. At block 301, the method may comprise a step of approaching a target container 202 at a forward momentum of the container-lifting device 100. At block 302, the method may comprise a step of contacting, using the friction contact surface 127, a front side of the target container 202. At block 303, the method may comprise a step of transferring, using the passive lifting mechanism 116, a fraction of the forward momentum into an upward momentum at the second end 126 such that the friction contact surface 127 applies an upward friction force to the front side of the target container 202 and lifts the front side of the target container 202. At block 304, the method may comprise a step of sliding the lifting fork 102 underneath the front side of the target container 202. At block 305, the method may comprise a step of extracting the target container 202 on the lifting fork 102.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A device comprising a lifting fork having a front end and a back end, a friction contact surface, and a passive lifting mechanism having a first end and a second end, wherein:

the first end of the passive lifting mechanism engages with the lifting fork between the front end and the back end, and the second end of the passive lifting mechanism is coupled to the friction contact surface;

the friction contact surface is configured to lift a target container;

the lifting fork is configured to slide underneath the target container when the container is lifted; and wherein the passive lifting mechanism transfers a fraction of a forward momentum of the container-lifting device into an upward momentum at the second end, and the friction contact surface lifts the target container by applying an upward force to one or more sides of the target container as a result of the upward momentum.

2. The device of claim 1, wherein the passive lift mechanism comprises a roller.

3. The device of claim 2, wherein the roller comprises a wheel and a shaft coupled to the passive lift mechanism between the first end and the second end of the passive lift mechanism.

4. The device of claim 3, wherein the wheel has a diameter greater than a height of the passive lifting mechanism.

5. The device of claim 2, wherein the roller transfers the forward momentum into the upward movement by moving onto the lifting fork via a lever mechanism.

6. The device of claim 1, wherein the first end of the passive lifting mechanism is configured to move along the lifting fork toward the front end or the back end on a track.

7. The device of claim 1, wherein the device further comprises a sliding bar that is slidably coupled to the lifting fork; and the first end of the passive lifting mechanism is pivotally coupled to the lifting fork at the sliding bar.

8. The device of claim 1, wherein the friction contact surface has a friction coefficient factor of at least 0.5.

9. The device of claim 1, wherein the front end of the lifting fork comprises an inclined plane.

10. The device of claim 1, wherein the device further comprises a mount flange coupled to the back end of the lifting fork, wherein the mount flange is configured to be removably coupled to a robot arm, a forklift, or a palletizer.

11. A device comprising:

a passive lifting mechanism having a first end and a second end;

a lifting fork having a front end and a back end, wherein the front end comprises an inclined plane;

a friction contact surface coupled to the second end of the passive lifting mechanism; and a sliding bar pivotally coupled to the first end of the passive lifting mechanism, wherein the sliding bar is slidably coupled to the lifting fork.

12. The device of claim 11, wherein the passive lift mechanism comprises a roller, the roller coupled to the passive lift mechanism between the first end and the second end of the passive lift mechanism.

13. The device of claim 12, the roller comprises a wheel and a shaft, the wheel having a diameter greater than a height of the passive lifting mechanism.

14. The device of claim 12, wherein the roller, by moving onto the lifting fork, transfers a fraction of a forward momentum of the container-lifting device into an upward momentum at the second end of the passive lift mechanism via a lever mechanism, and the friction contact surface lifts a target container by applying an upward force to one or more sides of the target container as a result of the upward momentum.

15. The device of claim 11, wherein the device further comprises a mount flange coupled to the back end of the lifting forks, wherein the mount flange is configured to be removably coupled to a robot arm, a forklift, or a palletizer.

16. A method comprising:

approaching a target container at a forward momentum of a container-lifting device comprising a lifting fork having a front end and a back end, a friction contact surface, and a passive lifting mechanism having a first end and a second end, wherein the first end of the passive lifting mechanism engages the lifting fork between the front end and the back end, and the second end of the passive lifting mechanism is coupled to the friction contact surface;

contacting, using the friction contact surface, a front side of the target container;

transferring, using the passive lifting mechanism, a fraction of the forward momentum into an upward momentum at the second end such that the friction contact surface applies an upward friction force to the front side of the target container and lifts the front side of the target container;

sliding the lifting fork underneath the front side of the target container; and extracting the target container on the lifting fork.

17. The method of claim 16, wherein when transferring the forward momentum into an upward momentum, the friction contact surface moves upward.

18. The method of claim 16, wherein when transferring the forward momentum into an upward momentum, the passive lifting mechanism moves toward the back end of the lifting fork.

19. The method of claim 16, wherein when sliding the lifting fork, the method further comprises pushing forward until the target container slides onto the lifting fork.

20. The method of claim 16, wherein when extracting the target container, the lifting fork tilts backward.

* * * * *